United States Patent Office 3,490,228
Patented Jan. 20, 1970

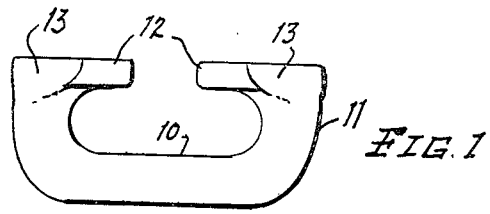
Fig. 1
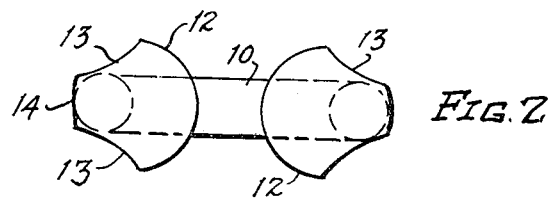
Fig. 2
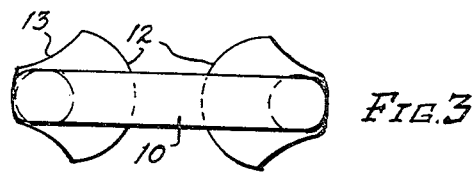
Fig. 3
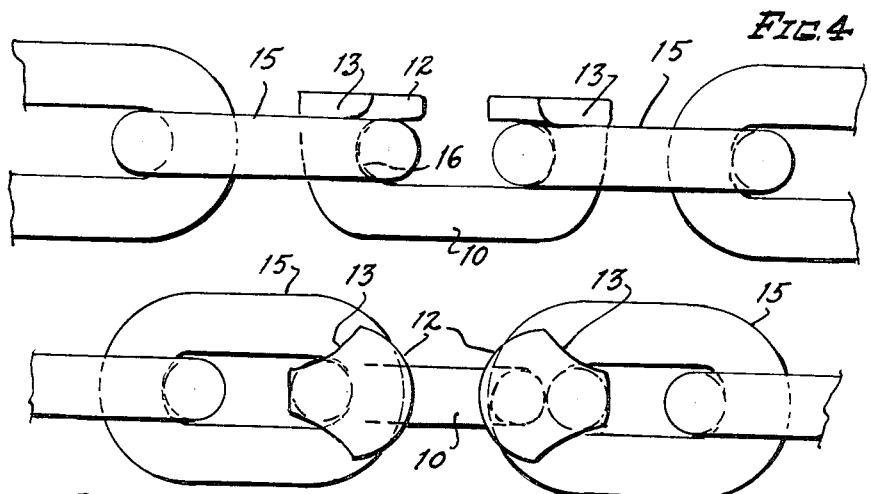
Fig. 4
Fig. 5

3,490,228
C-LINK WELDLESS CONNECTOR
Roger L. Gower, P.O. Box 65,
Canaan, Maine 04924
Filed June 5, 1967, Ser. No. 643,427
Int. Cl. F16g *15/04*
U.S. Cl. 59—93                                    1 Claim

ABSTRACT OF THE DISCLOSURE

The present disclosure relates to weldless connector means for chain and cable assemblies.

---

It is the purpose of this invention to provide a one-piece connector device using the connector head of my patent application being filed concurrently herewith, titled "Head for Weldless Connectors," and having a pair of heads as in said patent application at the ends of a C-link, said heads being integral with said C-link and with plates forming the terminus of said heads. The plates are so disposed as to provide a hiatus therebetween sufficient to permit the passage of the side or end of a chain link therethrough, and the bearing at each end of said C-link has a radius sufficient to accommodate the bar stock forming the link of said chain.

In the accompanying drawings forming a part of this application, in which like numerals are employed to designate like parts throughout the same, FIGURE 1 is a side elevation of a C-link of the present invention;

FIGURE 2 is a top plan view of said C-link showing the faces of the connector plates;

FIGURE 3 is a reverse view of the said C-link showing the back, or continuous side, and the head at each end thereof terminating in said plates;

FIGURE 4 shows a side elevation of a C-link of the present invention connecting two pieces of chain; and FIGURE 5 shows a top plan view of said C-link connecting together two lengths of chain.

In FIGURE 1, the back 10 of the C-link is shown with heads 11, 11 and plates 12, 12.

FIGURE 2 shows plates 12, 12 with arcs 13, 13 and secants 14, 14, as in my said co-pending application.

FIGURE 3 is a view of the reverse side of the said C-link, showing the plates 12, 12 as the sides thereof are visible beyond the back 10.

In FIGURE 4 a side elevation shows the C-link of the present invention connecting the ends of two pieces of chain. Plates 12, 12 have been inserted through said end links 15, 15 and heads 11, 11 rest in the bearings of the said end links, as at 16, 16.

The view of this connector as seen in FIGURE 5 shows the two plates 12, 12 inserted through the end links 15, 15, with like parts of said plates indicated as in FIGURE 2.

There are uses for weldless one-piece connectors where a C-link having an opening of nominal distance on one side proves advantageous over other conventional types of connectors. However, in all weldless connectors wherein a portion remains open, it is essential that the head of the hook member be of such a contour as to minimize the possibility of accidental disengagement, while at the same time permitting rapid assembly and, upon proper manipulation of the member, easy disengagement. That contour has been provided in my said co-pending patent application, and the C-link of the present invention, having the bearings inside the head and the adjacent plates resting in contiguity with interlinked chain, provides a straight pull on chain lengths so connected, while the plates of the two heads, lying in the same plane as the plane of the adjoining chain links, have a space between the most proximate points on their peripheries sufficient to permit passage therebetween of the side or end of the said adjoining chain links.

While the form of the invention as shown and described herein may be taken as a preferred example of the same, it is to be understood that modifications may be made without departing from the spirit of the invention, within the attached claim.

What I claim as my invention and desire to secure by Letters Patent of the United States is:

1. A connector device having a C-link terminating at each end thereof in hooks each comprising an integral head and plate, each of the latter lying in a plane perpendicular to the plane of the said C-link, wherein each of said hooks has a bearing on the inside of the head portion thereof, the distance between the most proximate points on said plates being substantially equal to the diameter of said bearings.

References Cited

UNITED STATES PATENTS

| | | | |
|---|---|---|---|
| 111,007 | 1/1871 | Sample | 59—85 |
| 1,388,305 | 8/1921 | Rieff | 59—85 |
| 1,476,583 | 12/1923 | Beard | 59—93 |
| 1,583,029 | 5/1926 | Thomas | 59—85 |

CHARLES W. LANHAM, Primary Examiner

G. P. CROSBY, Assistant Examiner

U.S. Cl. X.R.
152—244